United States Patent [19]
Schott

[11] 4,159,885
[45] Jul. 3, 1979

[54] CUTTING TOOL

[76] Inventor: Lawrence A. Schott, 15940 Warwick, Detroit, Mich. 48223

[21] Appl. No.: 812,450

[22] Filed: Jul. 5, 1977

[51] Int. Cl.² .............................................. B26D 1/00
[52] U.S. Cl. ................................... 407/114; 407/116; 407/118
[58] Field of Search ............... 407/114, 113, 118, 119, 407/116

[56] References Cited

U.S. PATENT DOCUMENTS

| | | | |
|---|---|---|---|
| 3,344,496 | 10/1967 | Patkay | 407/114 |
| 3,369,283 | 2/1968 | Colding | 407/119 |
| 3,381,349 | 5/1968 | Newcomer | 407/114 |
| 3,399,442 | 9/1968 | Jones et al. | 407/114 |
| 3,850,053 | 11/1974 | Bovenkerk | 407/119 |
| 3,882,580 | 5/1975 | Lundgren | 407/116 |
| 3,973,307 | 8/1976 | McCreery et al. | 407/114 |

FOREIGN PATENT DOCUMENTS 1517204  2/1968  France ...................................... 407/114

*Primary Examiner*—Leonidas Vlachos
*Attorney, Agent, or Firm*—Hauke and Patalidis

[57] ABSTRACT

A cutting tool, preferably in the form of a cutting insert of hard material, having a narrow land area or ledge along the cutting edge, and a top surface recessed below the ledge, the recess being deep enough to cause a continuous chip cut from a workpiece by the cutting edge to naturally flow into the recess without interference such as to promote the formation of a false cutting tip build-up during use of the cutting tool, the cutting tip build-up resulting from the transfer of material from the chip to the ledge surface. The invention further contemplates favoring the formation of cutting tip build-up by forming the ledge with a concave section and, in addition or in the alternative, by providing a plurality of diamond particles embedded in the ledge surface at least at the cutting tip of the tool.

28 Claims, 17 Drawing Figures

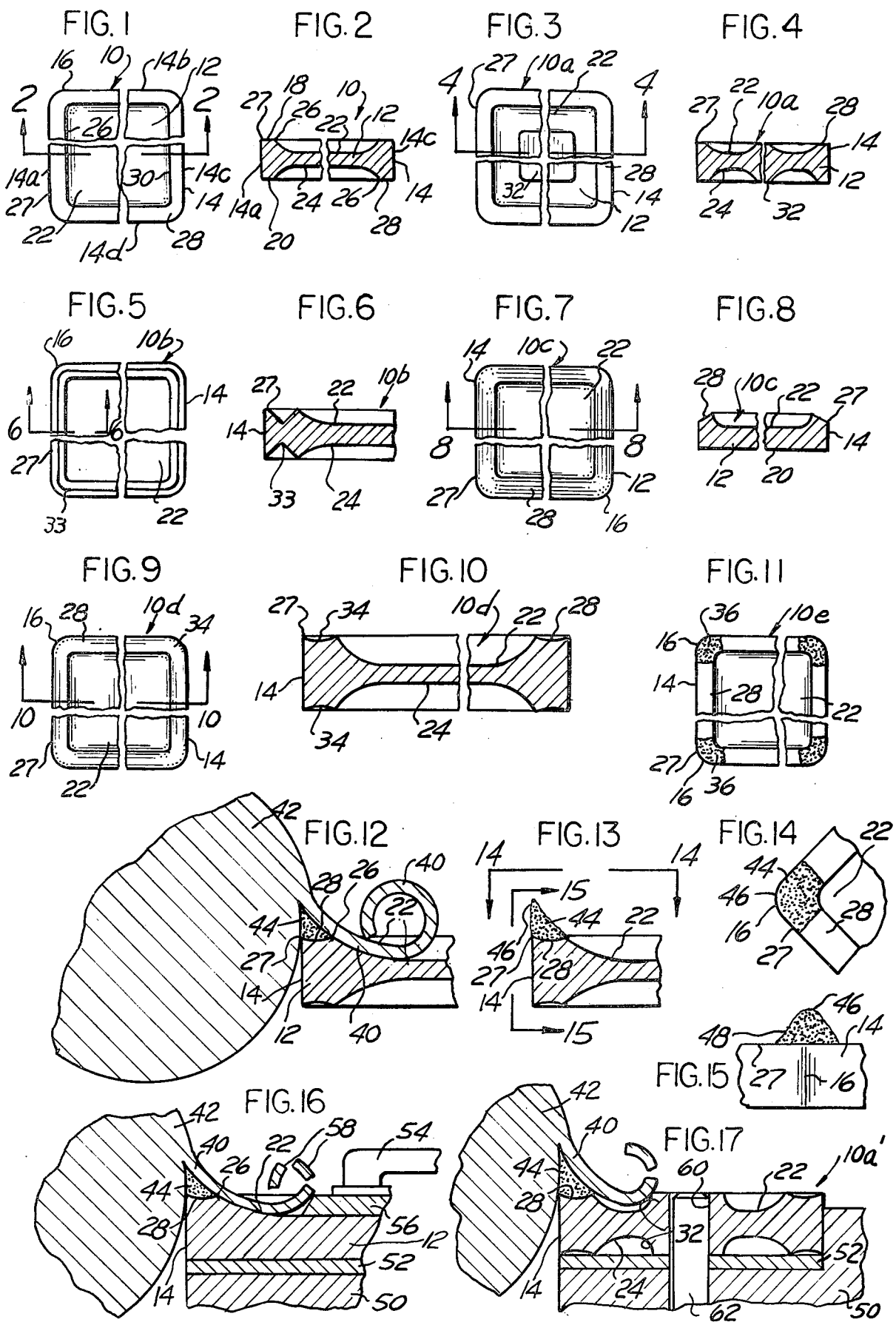

CUTTING TOOL

BACKGROUND OF THE INVENTION

The present invention relates to a cutting tool geometry in general, and more particularly to the geometry of throw-away cutting inserts so designed as to favor or promote the formation of a false cutting tip build-up at the cutting edge of the cutting tool during normal operation.

Cutting tools made of hard, wear-resistant material, such as cemented metal carbides, generally in the form of throw-away cutting inserts mounted on the tip of an appropriate tool holder, are of common use today when heavy cuts and high cutting speeds are desired. Such cutting inserts are used in combination with appropriate means for controlling the snaking chip removed from the workpiece, so as to break the continuous chip into small individual pieces which fall to the floor or into an appropriate container, without interfering with the cutting edge of the cutting tool, or with the workpiece, and without endangering the machine operator.

The chip control element, or chip breaker, may consist of a separate member which is engaged with the top surface of the cutting tool, at a position remote from the cutting edge or cutting tip and which, once clamped in position, interferes with the free flow of the continuous chip and breaks it into small pieces. Alternatively, chip breakers may take the form of appropriate recesses and rises formed integrally in a cutting insert. Whatever the type of chip control used, there results an additional costly element incorporated into the tool holder or a complex geometry for the cutting insert which in turn causes an increase in manufacturing costs due to complex shaped molds for forming the "green" inserts, complications and breakage due to uneven shrinkage during sintering and difficulties in finish grinding the inserts after sintering.

During cutting of a chip from a workpiece, the cutting edge or tip of the tool is subjected to considerable stress and loads, and the material at the cutting edge itself and behind the cutting edge is subject to considerable thermal shock, intense heat and constant abrasion. A stream of coolant and lubricating fluid is generally directed as close to the cutting edge as is permissible under the particular machining conditions. However, because the cutting edge itself is generally masked by the chip being removed from the workpiece, and because of the snaking of the chip and of the random breakage of the chip into small pieces, a free flow path for the lubricant-coolant is unavailable, and the flow is constantly interfered with and interrupted, which further increases the repeated thermal shocks to which the cutting tool is subjected. All those adverse conditions result in rapid wear of the cutting tool, and rapid dulling of the cutting edge.

It has been observed that under all conditions of chip formation, a transfer of material particles is effected from the chip and the workpiece to the cutting edge and to the surface of the cutting tool proximate the cutting edge, such transfer of particles causing a false cutting tip to build upon the surface of the cutting tool from the cutting edge to a short distance behind the cutting edge. The formation of such a false cutting edge which builds up on the cutting tool is particularly pronounced when intense heat is generated at the cutting tip, and the particles of material forming the cutting edge build-up become literally welded and strongly adhering to each other, with the particles at the base of the build-up adhering to the surface of the cutting tool. Such build-up of a false cutting tip, which is continuously renewed during cutting of the chip, provides a protective element interposed between the surface of the curling chip and the surface of the cutting tool which prevents direct contact between the chip and the cutting tool surface and cutting edge, such that the life of the cutting tool is greatly improved as the false cutting tip build-up acts as a shield against abrasion of the cutting tool surface and cutting edge by direct contact with the chip, and also as a shield against thermal shocks.

It has been discovered by applicant that the formation of a false cutting tip build-up is greatly improved if the surface of the cutting tool behind the cutting edge is in the form of a very shallow groove, is rough rather than smooth, is coated with a thin layer of diamond particles adhering to the surface, or if the cutting tool is operating at a negative cutting angle. Either one of those conditions, or a combination of some or all of those conditions, greatly promotes the formation of a false cutting tip build-up on a cutting tool, as long as the prerequisite condition of avoiding as much as possible disturbing the formation of a free flowing chip is also met.

SUMMARY OF THE INVENTION

According to the present invention, the formation of a false cutting tip build-up is greatly enhanced at the cutting edge of a cutting tool, such as a hard, wear resistant insert made, for example, of cemented hard metal carbides, ceramics, and the like, by providing the insert with an appropriate geometry promoting the formation of such false cutting tip build-up.

According to the present invention, the cutting insert is provided with a recessed surface having an edge extending proximate the insert cutting edge, the depth of such recess being such, and the width of the ledge formed between the edge of the recess and the edge of the cutting edge being so dimensioned, that the chip cut from the workpiece is free to flow into the recess without interference such as to promote the formation of a false cutting tip build-up at the cutting edge and on the ledge. The depth of the recess is at least 0.25 mm and preferably in the range of 1 to 2 mm. The ledge may be flat, but has preferably a shallow concave or curvilinear shape. The ledge may be disposed generally at a 90° angle to the side face of the cutting tool, but preferably it is disposed at an angle of more than 90° with the side face of the cutting tool so as to provide a negative cutting angle. The surface of the ledge is preferably provided with a plurality of fine diamond particles embedded in the surface, at least at the portions corresponding to the cutting tip of the tool.

In addition to promoting the formation of a false cutting tip build-up during use of the cutting tool, the particular geometry of the cutting tool according to the present invention results in some savings of the amount of cemented material used for forming cutting inserts in view of the presence of a recess on the top surface and, in most applications, on the bottom surface of the insert. The presence of such recesses on both top and bottom surfaces of an insert also results in the advantage of facilitating the seating of the cutting insert in a tool holder pocket.

The many objects and advantages of the present invention will become more apparent to those skilled in the art when the following detailed description of the best modes contemplated for practicing the invention is read in conjunction with the accompanying drawings wherein like reference numerals relate to like parts throughout the several views, and in which:

BRIEF DESCRIPTION OF THE DRAWING

FIG. 1 is a top plan view of an example of cutting tool in the form of a cutting insert according to the present invention;

FIG. 2 is a sectional view thereof along line 2—2 of FIG. 1;

FIG. 3 is a view similar to FIG. 1 but showing a modification thereof;

FIG. 4 is a sectional view along line 4—4 of FIG. 3;

FIG. 5 is a top plan view similar to FIGS. 1 and 3, but showing a further modification thereof;

FIG. 6 is a sectional view along line 6—6 of FIG. 5;

FIG. 7 is a view similar to FIG. 1 but showing another modification thereof;

FIG. 8 is a section through line 8—8 of FIG. 7;

FIG. 9 is a top plan view of a further modification of the invention;

FIG. 10 is a sectional view through line 10—10 of FIG. 9;

FIG. 11 is a top plan view of a further modification of the invention;

FIG. 12 is a schematic sectional view of a cutting insert according to the present invention while in use for effecting a cut in a workpiece;

FIG. 13 is a partial schematic view showing the false cutting tip formed on the cutting tool of FIG. 12;

FIG. 14 is a partial top view from line 14—14 of FIG. 13;

FIG. 15 is a partial front view from line 15—15 of FIG. 13;

FIG. 16 is a view similar to FIG. 12, but showing the operation of a cutting tool according to the invention provided with an auxiliary chip breaker; and FIG. 17 is a view similar to FIG. 16 but showing the operation of a cutting tool according to the invention having the configuration shown at FIGS. 3-6.

DETAILED DESCRIPTION OF THE PREFERRED EMBODIMENTS

Referring now to the drawing and more particularly to FIGS. 1-2, a typical cutting tool according to the present invention is in the form, for example, of a polygonal insert 10, made of cemented hard metal carbide which, in the example illustrated, is a square or rectangular plate, having a body 12 provided with a square or rectangular perimeter peripheral surface 14 defining four side faces 14a, 14b, 14c and 14d, consecutive side faces being joined by partially circular side portions 16. The insert 10 has a top surface 18 and a bottom surface 20 disposed in substantially parallel planes perpendicular to the planes of the side faces forming the peripheral surface 14.

The insert 10 may of course be of a different shape, such as triangular, rectangular, circular, pentagonal, hexagonal, etc., as is well known in the art, and instead of having rounded tips as illustrated at 16, it may be provided with sharp corners or tips.

The upper surface 18 of the insert 10 has a recess 22 and the lower surface 20 is provided with a similarly disposed recess 24. What is left of the upper surface 18 and of the lower surface 20 is disposed between the edge 26 of the recesses and the cutting edge 27 formed at the junction between the upper surface 18 or lower surface 20, respectively, and the peripheral surface 14, and it defines a land area or ledge 28 of an appropriate substantially constant width all around the insert body 12.

The recesses 22 and 24 are disposed symmetrically, and it has been found experimentally that the depth of each recess should at least be 0.25 mm, and preferably be of the order of 1 mm to 2 mm. The width of the ledge 28 is of the order of 1 mm to 2 mm. It is preferable to leave the surface of the ledge 28 unground and with the surface finish resulting from the sintering operation, although the peripheral surface 14 and the arcuate side surface at the tips 16 may be ground to a fine surface finish.

The sidewall of the recesses 22 and 24, designated by numeral 30 in the drawing, is preferably curvilinear in section, and a tangent to such surface at the edge 26 of the recess with the ledge 28 preferably forms with the surface of the ledge 18 an angle of 45° or more.

The depth of the recesses 22 and 24, the angular disposition of the recess wall 30 and to a lesser degree, the width of the ledge 28 are all of importance for promoting the formation of a false cutting tip build-up during use of the cutting insert 10 for removing a chip from a workpiece, as schematically illustrated at FIGS. 12-16 and as will be explained hereinafter in further detail.

In machining operations where it is desired to break the chip cut by the cutting edge 27 of the cutting insert 10 of FIGS. 1-2, the cutting insert is provided with an auxiliary chip control and breaking means as will be also explained hereinafter. The insert 10a of FIGS. 3-4 is alike the insert 10 of FIGS. 1-2, except that it is provided with an integral chip breaker 32 consisting of a projection disposed on the surface of each of the recesses 22 and 24, such to provide an obstruction to the free flow of the continuous chip cut from the workpiece. The integral chip breaker 32 is disposed at a relatively substantial distance behind the ledge 28, for the purpose of breaking the continuous chip into small fragments without interfering with the formation of the chip until it is entirely formed and flowing freely beyond the ledge and into the recess.

The insert 10b of FIGS. 5-6 is quite alike the insert 10a of FIGS. 3-4, except that the ledge 28 is in the form of a V-groove 33 rather than being flat, such a configuration having been found to favor the formation of a false cutting tip build-up.

The cutting insert 10c of FIGS. 7-8 has a configuration similar to that of FIGS. 1-2, that is with a recess 22 disposed in the upper face of the insert body 12. However, the insert 10c has a flat bottom surface 20, only the cutting edge 27 of the upper face being normally engaged with the workpiece during cutting. In other words, the cutting insert 10c, although indexable, is non-reversible. In addition, the cutting insert 10c has a ledge 28 which, instead of forming a 90° angle with the plane of the side faces defined by the peripheral surface 14, forms therewith an angle greater than 90°, such as to provide a negative cutting angle when disposed in a conventional insert holder. Such an angular disposition for the ledge 28, although conventional in the art and sometimes referred to as a "K-line" insert, presents the advantage of permitting to take a deeper cut in the workpiece with a substantial reduction of vibration, as compared to positive cutting angle tools, and it has been discovered by applicant that such an arrangement of negative cutting angle improves the formation of a false cutting tip build-up.

The only difference between the geometry of the cutting insert 10d of FIGS. 9-10, as compared to the geometry of the cutting insert 10 of FIGS. 1-2, is that relating to the particular shape of the ledge 28, as best seen in section at FIG. 2. Instead of being flat, the ledge 28 has a shallow concave surface, as shown at 34. Although the depth of the shallow depression 34 may vary from a few microns to a few millimeters, it has been discovered that the shallow depression nevertheless improves the formation of a false cutting tip build-up during use of the cutting tool. It will be readily apparent that forming the ledge 28 with a radially slightly concave surface is also applicable to the shape of cutting inserts illustrated at FIGS. 3-4 and 7-8.

FIG. 11 is a top plan view of a cutting insert illustrating a further modification of the invention, applicable to any one of the heretofore described embodiments. The insert 10e of FIG. 11 has areas of the ledge 28, preferably proximate the tips 16 which define the cutting tips of the insert during successive indexing, provided with a plurality of fine particles 36 of diamond embedded in the surface of the ledge 28. A method, such as disclosed in U.S. Pat. No. 3,369,283, may be used for embedding the diamond particles 36 in the surface of the ledge 28 prior to sintering by pressing diamond powder particles into the surface of the "green" insert at the appropriate portions of the ledge 28, by means of an appropriate stamp. Preferably, the particles of diamond have a grain size of a few microns. After sintering, the diamond particles are solidly embedded in the surface of the ledge 28, preferably proximate the cutting tips 16, and they provide a roughened wear resistant surface which substantially favors the build up of a false cutting tip during use of the cutting tool.

FIG. 12 schematically illustrates how an insert according to the present invention, while being used to cut a chip 40 from a workpiece 42, promotes the formation on the ledge 28 of a false cutting tip build-up 44 resulting from the transfer of metal particles from the continuous chip 40 and the surface of the workpiece 42 rubbing against the cutting edge 27. It is readily apparent that such false cutting tip 44 provides a thermal and mechanical protective shield for the cutting edge 27 and the ledge 28. In order to promote and encourage the formation of a false cutting tip 44, the recess 22 disposed on the top of the cutting insert body 12 must be deep enough to enable the chip 40 to flow over the edge 26 of the recess without interference and without breaking up into small fragments. In the event that the false cutting tip 44 is destroyed as a result, for example, of effecting interrupted cuts or due to excessive vibration of the cutting tool and/or workpiece, it is rapidly and continuously reformed during each cutting operation. Although the particular cutting tool geometries herein illustrated and described are particularly effective to promote the formation of the false cutting tip 44, smooth vibration-less cutting by means of properly adjusted cutting inserts supported by sturdy tool holders, mounted on rigid slides and operating at high cutting speeds and without the use of lubricant-coolant, results in the formation of a false cutting tip which is durable and has a surface which is constantly renewed at the same rate as it is abraded as a result of frictional engagement with the lower surface of the chip 40.

As shown at FIGS. 13-15, the false cutting tip 44 builds up at the cutting tip 27 of the tool to a maximum height and a sharp edge 46 which is progressively rounded off as shown at 48 at FIG. 15, when seen in front projection. Although it has been demonstrated that sharpening the cutting edge of a cutting tool with the shape of the false cutting edge 44 schematically illustrated at FIGS. 13-14 would not result in an effective cutting tool of durable quality, because the sharp cutting edge 46 would be rapidly destroyed, the formation of the false cutting tip 44 on the ledge 28 of the cutting tool of the invention results in a considerable decrease of the power required for effecting a cut of a given depth in a workpiece, as compared to using a cutting tool of a geometry not favoring the formation of a false cutting tip build-up. In addition, a better surface finish on the workpiece and, more particularly and more importantly yet, a considerably prolonged life for each indexable cutting edge of an indexable cutting insert are achieved.

With the arrangement of FIG. 12, a continuous chip 40 is formed which, in most cutting operations, may present some inconveniences and even danger to the machine operator due to the entanglement between the long snaking chip and the machine parts and the workpiece. To remedy such problems, a cutting insert according to the present invention, when mounted in the pocket of a tool holder 50 above an anvil or shim 52, FIG. 16, may be clamped in position in the tool holder pocket by means of a conventional clamp mechanism 54, a chip breaker block 56 being disposed in the recess 22 and being interposed between the recess surface and the bottom face of the clamp. The chip breaker 56 is disposed far enough from the edge 26 of the recess 22 not to interfere with the formation of the chip 40, but nevertheless presents an obstruction to the free flow of the chip which causes it to be broken into small fragments 58.

Although the cutting inserts heretofore described consist of massive inserts, that is inserts which when placed in the pocket of a tool holder must be clamped in position by means of a clamping mechanism dependent from the tool holder, the principle and structure of the invention are also applicable to cutting inserts provided with a substantially centrally disposed mounting hole. Such an arrangement is illustrated at FIG. 17, wherein a cutting insert 10a' of the geometry illustrated at FIGS. 3-4 is held in the tool holder 50 by means of a mounting hole 60 into which projects the eccentric mounting pin 62 of the tool holder, according to a structure well known in the art for holding inserts in the pocket of tool holders. The insert 10a' of FIG. 17 is provided with an integral chip breaker 32 which accomplishes the same purpose as the auxiliary chip breaker 56 of FIG. 16.

Having thus described the present invention by means of typical structural embodiments thereof, given for illustrative purpose only, modifications whereof will be apparent to those skilled in the art, what is claimed as new is as follows:

1. A cutting tool for removing chips from a workpiece comprising a plate of a single hard material having a bottom surface, a top surface and a peripheral surface whereby said peripheral surface and at least said top surface form a cutting edge at their junction, a recess in at least said top surface, said recess having an edge extending proximate said cutting edge and forming a perimetric ledge of substantially constant width extending radially from said cutting edge to said recess edge, and said recess being of a depth sufficient to cause a continuous chip to flow from said cutting edge into said recess and said perimetric ledge being in the form of a shallow groove such as to promote the formation of a false cutting tip build-up during use of said cutting tool, said perimetric ledge providing an anchoring surface for said false cutting tip build-up.

2. The cutting tool of claim 1 wherein both said top and bottom surfaces are provided with said recess.

3. The cutting tool of claim 1 wherein said perimetric ledge is in the form of a V-groove.

4. The cutting tool of claim 1 wherein said perimetric ledge is curvilinear in radial section.

5. The cutting tool of claim 1 wherein at least the surface of said perimetric ledge at the cutting tip of said tool has a plurality of diamond particles embedded in said surface.

6. The cutting tool of claim 3 wherein at least the surface of said perimetric ledge at the cutting tip of said tool has a plurality of diamond particles embedded in said surface.

7. The cutting tool of claim 4 wherein at least the surface of said perimetric ledge at the cutting tip of said tool has a plurality of diamond particles embedded in said surface.

8. The cutting tool of claim 1 wherein said recess is at least 0.25 mm deep.

9. The cutting tool of claim 2 wherein said recess is at least 0.25 mm deep.

10. The cutting tool of claim 8 wherein said recess is in the range of 1 to 2 mm deep.

11. The cutting tool of claim 9 wherein said recess is in the range of 1 to 2 mm deep.

12. A cutting tool for removing chips from a workpiece comprising a plate of a single hard material having a bottom surface, a top surface and a peripheral surface whereby said peripheral surface and at least said top surface form a cutting edge at their junction, a recess in at least said top surface, said recess having an edge extending proximate said cutting edge and forming a flat perimetric ledge of substantially constant width extending radially from said cutting edge to said recess edge, and said recess being of a depth sufficient to cause a continuous chip to flow from said cutting edge into said recess, said flat perimetric ledge having a roughened surface such as to promote the formation of a false cutting tip build-up during use of said cutting tool, said roughened surface of said perimetric ledge providing an anchoring surface for said false cutting tip build-up.

13. The cutting tool of claim 12 wherein both said top and bottom surfaces are provided with said recess.

14. The cutting tool of claim 12 wherein said perimetric ledge and said peripheral surface are mutually disposed at said cutting edge at a substantially 90° angle.

15. The cutting tool of claim 12 wherein said perimetric ledge and said peripheral surface are disposed at an angle comprised substantially between 90° and 110°.

16. The cutting tool of claim 12 wherein said perimetric ledge is flat.

17. The cutting tool of claim 12 wherein said perimetric ledge is in the form of a V-groove.

18. The cutting tool of claim 12 wherein said perimetric ledge is curvilinear in radial section.

19. The cutting tool of claim 12 wherein at least the surface of said perimetric ledge at the cutting tip of said tool has a plurality of diamond particles embedded in said surface.

20. The cutting tool of claim 14 wherein at least the surface of said perimetric ledge at the cutting tip of said tool has a plurality of diamond particles embedded in said surface.

21. The cutting tool of claim 15 wherein at least the surface of said perimetric ledge at the cutting tip of said tool has a plurality of diamond particles embedded in said surface.

22. The cutting tool of claim 16 wherein at least the surface of said perimetric ledge at the cutting tip of said tool has a plurality of diamond particles embedded in said surface.

23. The cutting tool of claim 17 wherein at least the surface of said perimetric ledge at the cutting tip of said tool has a plurality of diamond particles embedded in said surface.

24. The cutting tool of claim 18 wherein at least the surface of said perimetric ledge at the cutting tip of said tool has a plurality of diamond particles embedded in said surface.

25. The cutting tool of claim 12 wherein said recess is at least 0.25 mm deep.

26. The cutting tool of claim 13 wherein said recess is at least 0.25 mm deep.

27. The cutting tool of claim 25 wherein said recess is in the range of 1 to 2 mm deep.

28. The cutting tool of claim 26 wherein said recess is in the range of 1 to 2 mm deep.

* * * * *

UNITED STATES PATENT AND TRADEMARK OFFICE
CERTIFICATE OF CORRECTION

PATENT NO. : 4,159,885
DATED : July 3, 1979
INVENTOR(S) : Lawrence A. Schott

It is certified that error appears in the above-identified patent and that said Letters Patent are hereby corrected as shown below:

Column 4, line 19, change "18" to --28--.

Signed and Sealed this

Ninth Day of October 1979

[SEAL]

Attest:

RUTH C. MASON
Attesting Officer

LUTRELLE F. PARKER
Acting Commissioner of Patents and Trademarks